March 12, 1968   E. C. LAMBRIGHT   3,372,459
WINDSHIELD BOND CUTTING
Filed Oct. 20, 1965   2 Sheets-Sheet 1
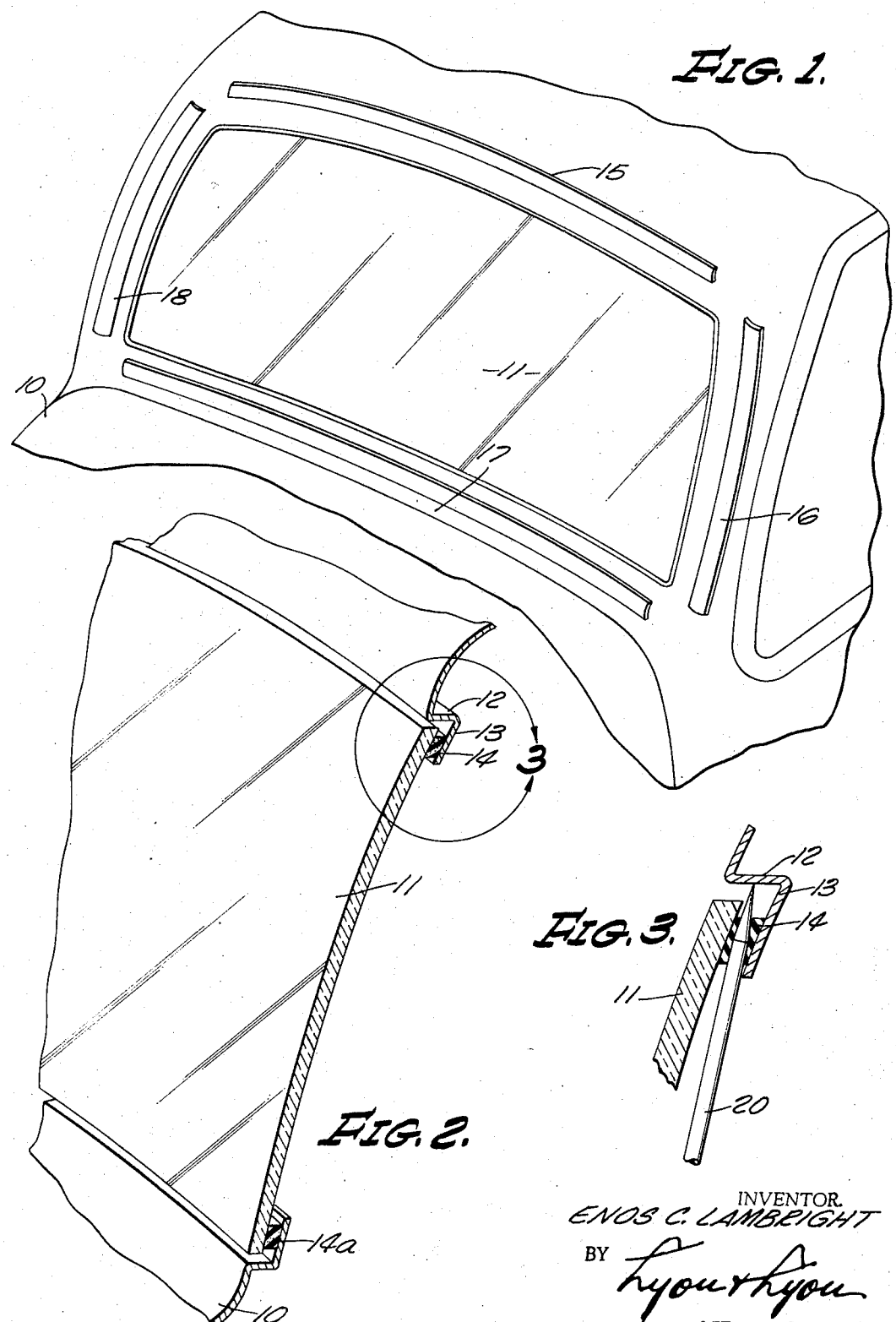
INVENTOR.
ENOS C. LAMBRIGHT
BY Lyon & Lyon
ATTORNEYS March 12, 1968     E. C. LAMBRIGHT     3,372,459

WINDSHIELD BOND CUTTING

Filed Oct. 20, 1965     2 Sheets-Sheet 2

INVENTOR.
ENOS C. LAMBRIGHT
BY Lyon & Lyon
ATTORNEYS

United States Patent Office 3,372,459
Patented Mar. 12, 1968

3,372,459
WINDSHIELD BOND CUTTING
Enos C. Lambright, 2359 Main St.,
Riverside, Calif. 92501
Filed Oct. 20, 1965, Ser. No. 498,890
2 Claims. (Cl. 29—401)

ABSTRACT OF THE DISCLOSURE

A process of salvaging windshields from automobiles wherein the glass is secured to the vehicle by adhesives characterized by punching holes through the adhesive bond at opposite sides of the windshield after removing the trim, passing a strong wire through the holes and across the pane so that on see-saw manipulation of the wire as a cutting instrument by appropriate hand grips the pane is removed intact from the vehicle.

---

This invention relates to a windshield bond cutting and more particularly to removal of a windshield from a modern automobile as a complete intact unit without any chipping, marring or breakage.

In present day automobiles and particularly with those having a curved windshield in the front of the vehicle, it is common practice to install such a windshield by glueing the glass directly to a shoulder or ledge in the body of the vehicle and then masking this joint with a cover strip or trim. Particularly in salvage operations it has been almost impossible to remove such windshields without breaking them but it has been discovered that by providing access to the adhesive bond and the use of a cutting wire the adhesive bond may be broken completely around the periphery of the windshield so that the windshield may be removed intact for replacement or salvage.

The mechanisms hereinafter proposed for accomplishing the objects of this invention are extremely simple consisting simply of a piercing punch and an elongated piece of thin strong wire, such as piano wire, held between two gripping handles and the invention herein consists of the concept by use of these simple tools in the manner herein set forth, such windshields can be readily, simply and economically removed intact for replacement or salvage.

These and other objects, features and advantages of the invention will be apparent by the annexed specification in which:

FIGURE 1 is a fragmentary perspective view of the front of a motor vehicle with the windshield trim strips removed;

FIGURE 2 is a fragmentary enlarged perspective view, partly in section, of one end of the vehicle adjacent the windshield with the trim removed;

FIGURE 3 is a fragmentary side view of the area shown along the lines 3—3 of FIGURE 2 illustrating the initial punching operation;

Figure 4:
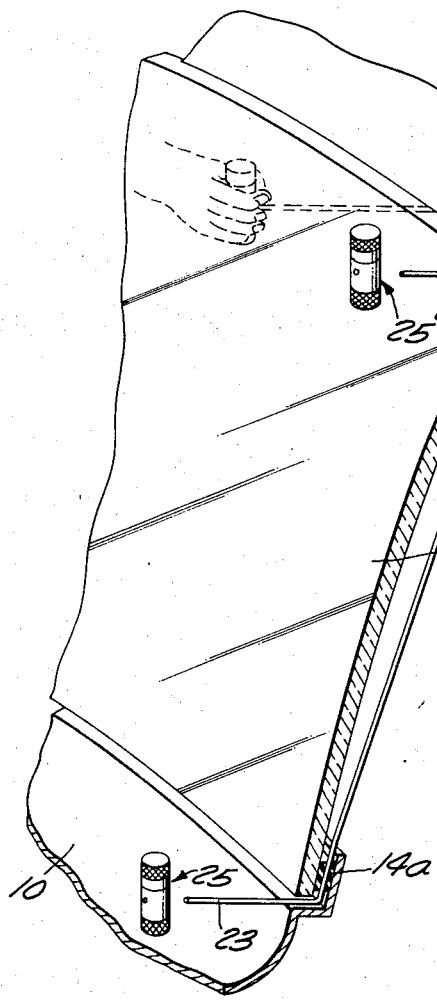
FIGURE 4 is a view similar to FIGURE 2 with the cutting wire inserted.

Referring now more particularly to the drawings, particularly to FIGURE 1 there is shown the front of a vehicle 10 having a windshield 11. The vehicle 10 normally has formed integrally with the body thereof a shoulder 12 and a leg 13 as shown in FIGURE 2 forming a seat for the windshield 11 as indicated in FIGURE 2.

Such a seat may be formed at both the top and bottom of the windshield 11 and even sometimes, but not necessarily, such a seat may be formed along the sides of the windshield 11. In any event, the windshield is normally held in position by an adhesive bond 14 extending all the way around the edge of the windshield between the edge of the windshield and the seat formed by the leg 13. A finished appearance is generally applied to the vehicle by attaching trim strips 15, 16, 17, and 18 to cover the edges.

To remove the windshield according to the present invention the trim strips 15, 16, 17 and 18 are first removed. Then at one side working from the interior of the vehicle a punch 20 is inserted completely through the bond 14 as illustrated in FIGURE 3. A like operation is carried out at the bottom of the windshield to break the bond 14A (FIGURE 2), in each case producing a hole through which may be passed one end of a piano wire. Because of the stiffness of the piano wire it can be inserted as shown in FIGURE 4 so that the piano wire 21 extends downwardly and has ends 22 and 23 extending outwardly. The result is the condition as shown in FIGURE 4 at which time the handles 25 are attached to the ends 22 and 23 of the wire. Each handle 25 consists of a rod 26 having a bore 27 therethrough and a central upper opening 28 which is threaded as at 29 to receive the threaded part 30 of a set screw 31. The set screw 31 has an enlarged head 32 preferably knurled as at 33 for security in gripping and in fact, the other end 34 of the rod 26 may be similarly knurled. With the handles firmly attached to the ends 22 and 23 to the wire 21, the wire is stretched taut and then pulled along the top and bottom of the windshield thus breaking the upper and lower adhesive bonds 14 and 14A. If there are side bonds the operation may be continued by drawing the wire down around each side of the windshield glass. In some instances to facilitate the cutting action of the wire, the wire may be seesawed back and forth between the hands of the operator. The foregoing operation results in a clean cut which allows the windshield 11 to be removed intact.

Figure 5:
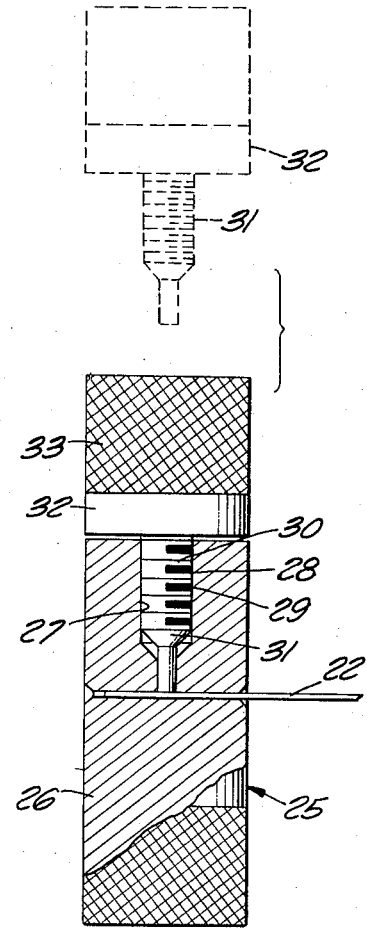
FIGURE 5 is an enlarged view of one of the handles for securing the cutting wire.

As above described the tools employed in the invention are extremely simple consisting simply of the punch 20, the wire 21 such as a piano wire, which is stiff enough to take the ends 22 and 23 and the handles 25 which may be secured thereon by the device shown in FIGURE 5.

While there has been described what is at present considered a preferred embodiment of the present process and tools of this invention, it will be appreciated by those skilled in the art that various changes and modifications can be made therein without departing from the essence of the invention and it is intended to cover herein all such changes and modifications as come within the true spirit and scope of the appended claims.

What is claimed is:

1. A process for removing intact a windshield which is secured to a motor vehicle by an adhesive bond comprising the steps of: removing the trim from the windshield; forming two spaced holes through said adhesive bond at spaced intervals and on opposite sides of said windshield around said windshield; inserting a wire through one of said holes, along one edge of said windshield and out of the other of said holes; attaching hand grip handles to the free ends of said wire and pulling said wire in taut condition completely across all of said adhesive bond to cut said bond and free said windshield.

2. A process for removing intact a windshield which is secured to a motor vehicle by an adhesive bond comprising the steps of: removing the trim from the windshield; forming two spaced holes through said adhesive bond at spaced intervals and on opposite sides of said windshield around said windshield; inserting a wire through one of said holes, along one edge of said windshield and out of the other of said holes; attaching hand grip handles to the free ends of said wire and pulling said wire with a seesaw action in taut condition completely across all of said adhesive bond to cut said bond and free said windshield.

References Cited

UNITED STATES PATENTS

| | | | |
|---|---|---|---|
| 1,175,697 | 3/1916 | Braun | 29—200 |
| 1,355,781 | 10/1920 | Rodgers | 29—401 X |
| 2,820,282 | 1/1958 | Schneider | 29—200 |
| 2,953,847 | 9/1960 | Reed | 29—401 |
| 3,084,425 | 4/1963 | Erskine | 29—403 |
| 3,136,045 | 6/1964 | De Rieux et al. | 29—403 |

THOMAS H. EAGER, *Primary Examiner.*